(12) United States Patent
Turner

(10) Patent No.: US 10,054,146 B1
(45) Date of Patent: Aug. 21, 2018

(54) SHACKLE GUARD WITH TETHER

(71) Applicant: Daystar Products International, Inc., Phoenix, AZ (US)

(72) Inventor: Mark Alan Turner, Phoenix, AZ (US)

(73) Assignee: Daystar Products International, Inc., Phoenix, AZ (US)

( * ) Notice: Subject to any disclaimer, the term of this patent is extended or adjusted under 35 U.S.C. 154(b) by 0 days.

(21) Appl. No.: 15/798,306

(22) Filed: Oct. 30, 2017

(51) Int. Cl.
*F16G 11/12* (2006.01)
*F16B 21/12* (2006.01)
*F16B 21/14* (2006.01)

(52) U.S. Cl.
CPC ............ *F16B 21/125* (2013.01); *F16G 11/12* (2013.01); *F16B 2021/14* (2013.01)

(58) Field of Classification Search
CPC .... F16B 21/125; F16B 2021/14; F16G 11/12; F16G 15/06; B66C 1/122
USPC ...................... 294/74, 82.1, 82.11; 59/86, 93
See application file for complete search history.

(56) References Cited

U.S. PATENT DOCUMENTS

| | | | | |
|---|---|---|---|---|
| 48,844 | A * | 7/1865 | Shogren | |
| 1,527,281 | A * | 2/1925 | Stapfer | F16B 45/00 24/598.7 |
| 3,224,185 | A * | 12/1965 | Grim | F16G 15/06 294/74 |
| 3,352,590 | A * | 11/1967 | Barthule | B66C 1/18 294/74 |
| 4,925,226 | A * | 5/1990 | Leonard, Jr. | B66C 1/663 294/102.1 |
| 5,647,198 | A * | 7/1997 | Mihailovic | B63H 9/10 59/86 |
| 5,660,423 | A * | 8/1997 | Herman | B66C 1/18 24/197 |
| 6,298,528 | B1 * | 10/2001 | Workman | A45C 13/30 24/265 CD |
| 9,314,836 | B2 * | 4/2016 | Ogden | B21L 9/08 |
| 2012/0201599 | A1 * | 8/2012 | Reppen | F16G 15/06 403/348 |

OTHER PUBLICATIONS

Daystar product brochure and photos from brochure showing D Ring Isolators, 2009, 4 pages.

* cited by examiner

*Primary Examiner* — Dean J Kramer
(74) *Attorney, Agent, or Firm* — Lowe Graham Jones PLLC

(57) ABSTRACT

A guard defines an inner seat comprising an open channel shaped to receive a shackle and extend partially around the shackle. The guard further includes an outer seat positioned opposite the open channel and shaped to support a strap passing through the shackle. A tether is fastened to the guard and defines a fastener for securing to a closure pin passing through the shackle. In some embodiments, the fastener comprises a hole formed in the tether and a barb formed on the tether offset from the hole. In some embodiments, the fastener comprises a hole formed in the tether and offset from a distal end of the tether and a barb at the distal end of the tether for insertion within the hole.

18 Claims, 9 Drawing Sheets

SHACKLE GUARD WITH TETHER

FIELD OF THE INVENTION

This invention relates to shackles to which lifting straps may be secured for hoisting materials.

BACKGROUND OF THE INVENTION

D-rings are used on equipment and vehicles as a point to lift or connect straps. The D-rings typically include a shackle with through holes on two arms. A screw or bolt passes through the holes and is secured in place, such as by a threaded connection in one of the holes. A lifting machine is fastened to the pin, such as by the pin passing through a hole in a connector fastened to the lifting machine. Straps then pass over the shackle and carry materials to be lifted. As machinery moves the D-ring, the pin may unscrew, allowing the D Ring to detach and any load to fall to the ground.

The apparatus disclosed herein provides a device for improving the function and appearance of D rings.

SUMMARY OF THE INVENTION

In one aspect of the invention an apparatus includes a guard defining an inner seat comprising an open channel shaped to receive a shackle and extend partially around the shackle. The guard further includes an outer seat positioned opposite the open channel and shaped to support a strap passing through the shackle. The apparatus further includes a tether fastened to the guard and defining a fastener for securing to a closure pin passing through the shackle.

The open channel may have an arcuate axis. In some embodiments, along the arcuate axis, a wall of the open channel is arcuate in a plane to which the arcuate axis is normal. In some embodiments, outer edges of the wall include one or more indentations. In some embodiments, the tether secures to an outer edge of the wall. In some embodiments, the tether is co-molded with the guard. In some embodiments, the outer seat has an arcuate shape that is concentric with the arcuate axis.

In some embodiments, the fastener comprises a hole formed in the tether and a barb formed on the tether offset from the hole. In some embodiments, the fastener comprises a hole formed in the tether and offset from a distal end of the tether and a barb at the distal end of the tether for insertion within the hole.

In use, the shackle is seated within the open channel and a closure pin is inserted through the shackle having the fastener securing the tether to the closure pin.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1A:
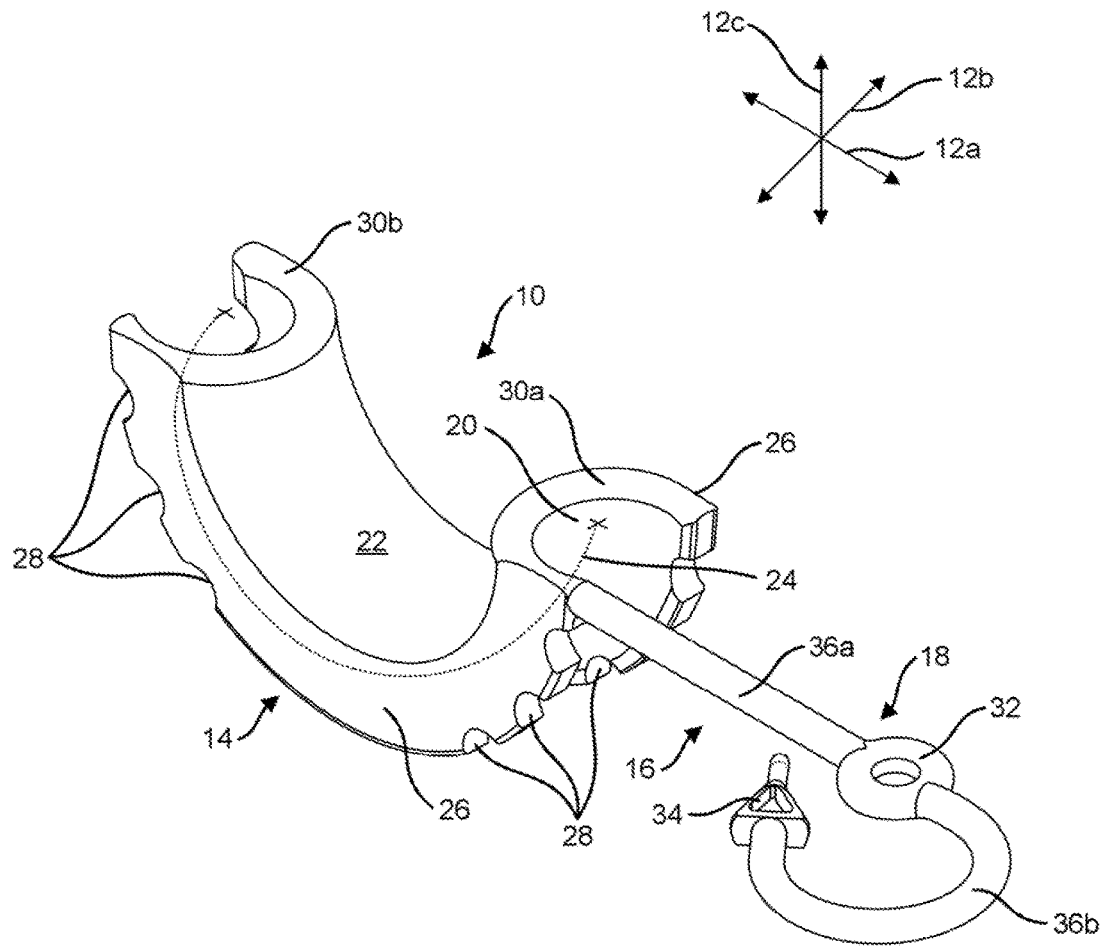
FIGS. 1A and 1B are isometric views of a shackle guard with a tether in accordance with an embodiment of the present invention.
Figure 1B:
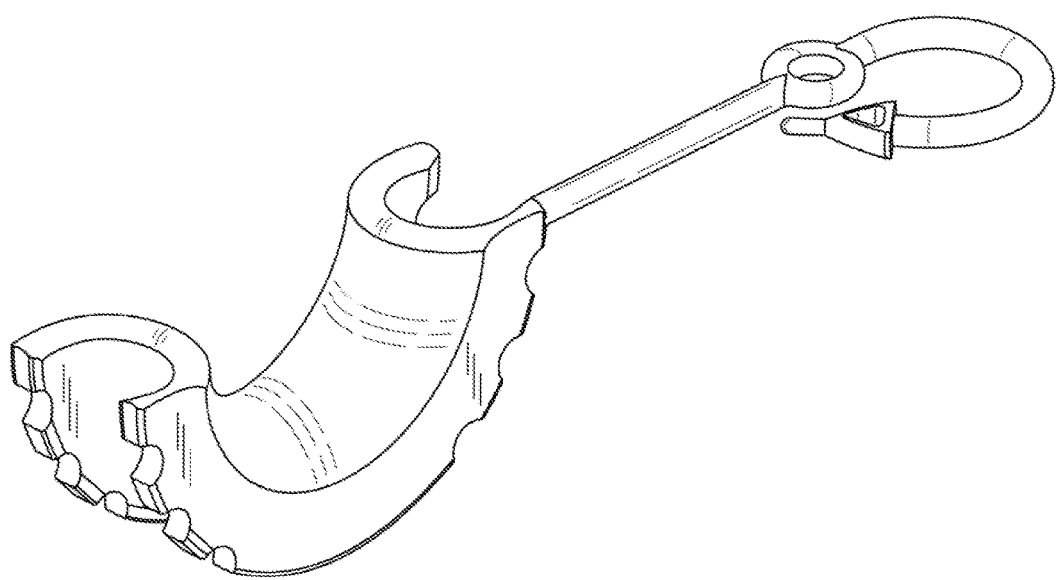
Figure 1C:
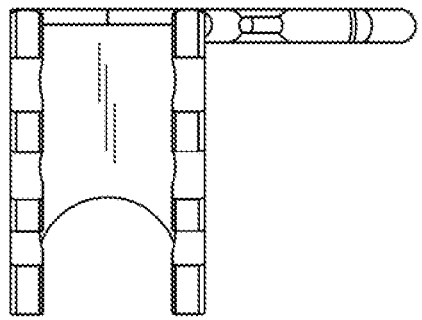
FIG. 1C is a left view of the embodiment of FIGS. 1A and 1B.
Figure 1D:
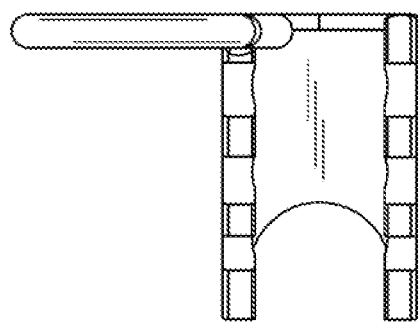
FIG. 1D is a right view of the embodiment of FIGS. 1A and 1B.
Figure 1E:
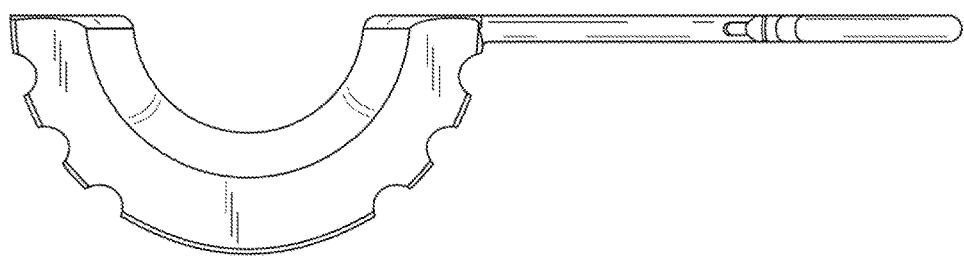
FIG. 1E is a front view of the embodiment of FIGS. 1A and 1B.
Figure 1F:
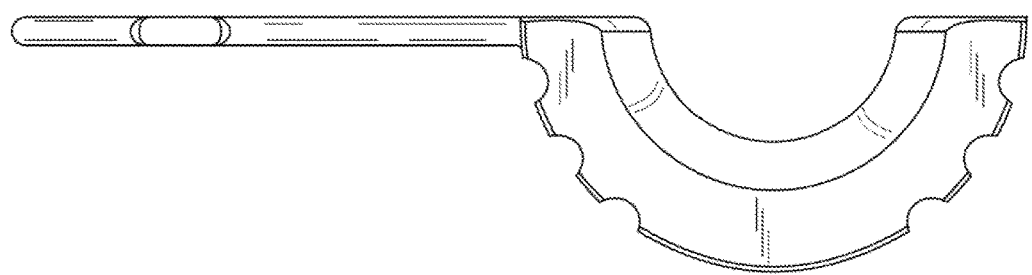
FIG. 1F is a rear view of the embodiment of FIGS. 1A and 1B.
Figure 1G:
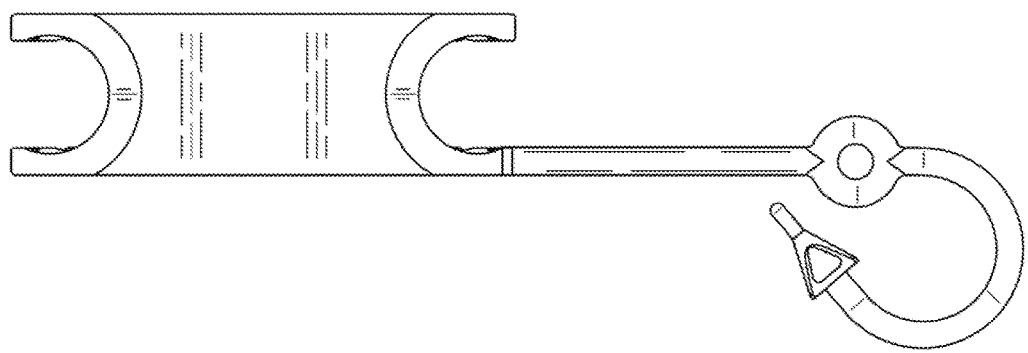
FIG. 1G is a top view of the embodiment of FIGS. 1A and 1B.
Figure 1H:
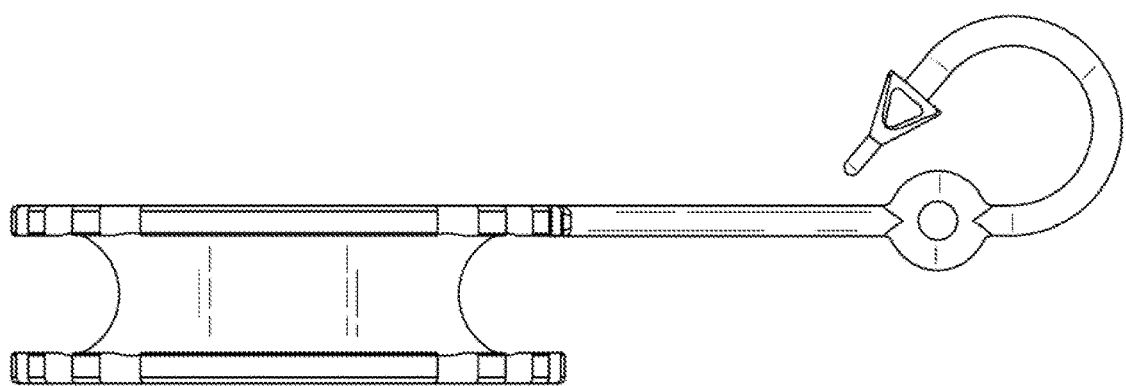
FIG. 1H is a bottom view of the embodiment of FIGS. 1A and 1B.

Referring to FIGS. 1A to 1H, an apparatus 10 as described herein may be understood with respect to a longitudinal direction 12a, a horizontal direction 12b, and a vertical direction 12c that are all mutually perpendicular.

The apparatus 10 includes a guard 14 and a tether 16 fastened to the guard 14. A fastener 18 is mounted on the tether 16 for securing the tether 16 to the pin of a D-ring. The guard 14 defines channel 20 for receiving the shackle of a D-ring and an outer seat 22 for supporting a strap passing through the shackle.

As is apparent in FIG. 1A, the axis 24 of the channel 20 defines an arcuate path in a plane parallel to the longitudinal and vertical directions 12a, 12c ("a longitudinal-vertical plane"). The path followed by the axis 24 and any variation in the cross-sectional shape of the channel 20 along the axis 24 may conform to a shackle of a D-ring. For example, in the illustrated embodiment, the channel 20 conforms to a toroidal shape. The axis 24 may therefore be defined as the center of the circular cross sections of the toroidal shape The channel 20 is open along its axis 24 in order to permit insertion of the shackle. In each plane to which the axis 24 is normal, the channel 20 may have an arcuate shape. Where a portion of the shackle has a toroidal shape, the shape of the channel 20 in each plane may be semicircular, e.g. an arc of N degrees. Where N is greater than 180 degrees, deformation of the guard 14 may be required to place the guard 14 on a shackle and therefore the guard 14 operates as a self-retaining clip. For example, N may be an angle between 181 and 220 degrees, preferably between 185 and 200 degrees.

The outer seat 22 may likewise have an arcuate shape in a longitudinal-vertical plane and may also have portion thereof that conforms to a toroidal shape, particularly where the channel 20 also conforms to a toroidal shape of a smaller diameter. The rounded outer seat 22 may facilitate use with straps without cutting or snagging on the straps.

In the illustrated embodiment, the guard 14 may include flattened walls 26 that do not conform to the toroidal shape as does the outer seat 22. In particular, the walls 26 may be planar parallel to a longitudinal-vertical plane and offset from one another along the horizontal direction 12b. As is apparent, the lower edges of the walls 26 are semicircular in a longitudinal-vertical plane. In the illustrated embodiment, indentations 28 are formed in the walls 26 and that protrude inwardly from the lower edges of the walls 26 in a longitudinal-vertical plane intersecting the walls 26.

In the illustrated embodiment, the indentations 28 are non-uniformly distributed and may server a primarily decorative function, e.g., simulated a look of a tire tread. Likewise, the planar side walls 26 may also be a decorative feature rather than having a functional purpose.

In the illustrated embodiment, guard includes ends 30a, 30b, which may be planar and parallel to one another. The ends 30a, 30b may be coplanar with one another. For example, the axis 24 of the channel 20 may have an arcuate shape and may have an arc length of 180 degrees such that the end 30a, 30b are coplanar on a plane that is perpendicular at its points of intersection with the axis 24. The end 30a, 30b are primarily decorative and may therefore have any angle or shape. For example, the ends 30a, 30b may be chamfered or be other than parallel to one another.

In the illustrated embodiment, the tether 16 secures to the guard 14 near one of the ends 30a. For example, the tether 16 may have a circular cross section that is tangent to the planar end 30a. The cross section and point of securement of the tether 16 is primarily decorative. Accordingly, the cross section could be any other shape, such as square, rectangular, or the like. Likewise, the tether 16 may secure at various points along the lower edge of either wall 26 or at any other point on the guard 14.

The fastener 18 in the illustrated embodiment is selected for its appearance when fastened and when unfastened. In the illustrated embodiment, the fastener includes a ring 32 and a barb 34 sized to insert within the ring 32. The ring 32 is secured between a proximal portion 36a and s distal portion 36b of the tether 16. The barb 34 is secured at the distal end of the distal portion. In this manner, distal portion 36b may be bent until the barb 34 is inserted through the ring 32. The barb 34 is deformable to insert through the ring 32 and thereafter resists removal unless sufficient force is applied to deform one or both of the barb 34 and ring 32 and force the barb 34 back through the ring 32. The ring 32 may be any shape (square, octagonal, etc.) and may include an opening of any shape as well that permits insertion of the barb 34 and resists removal.

Other variations are also possible. For example, the ring 32 may be formed at the distal end of the distal portion 36b whereas the barb 34 protrudes outwardly from a point between the proximal and distal portions 36a, 36b.

In the illustrated embodiment, the tether 16 and guard 14 are co-molded of the same material such as a resilient polymer. For example, polyurethane is used for its strength, durability, and resistance to UV light.

Figure 2:
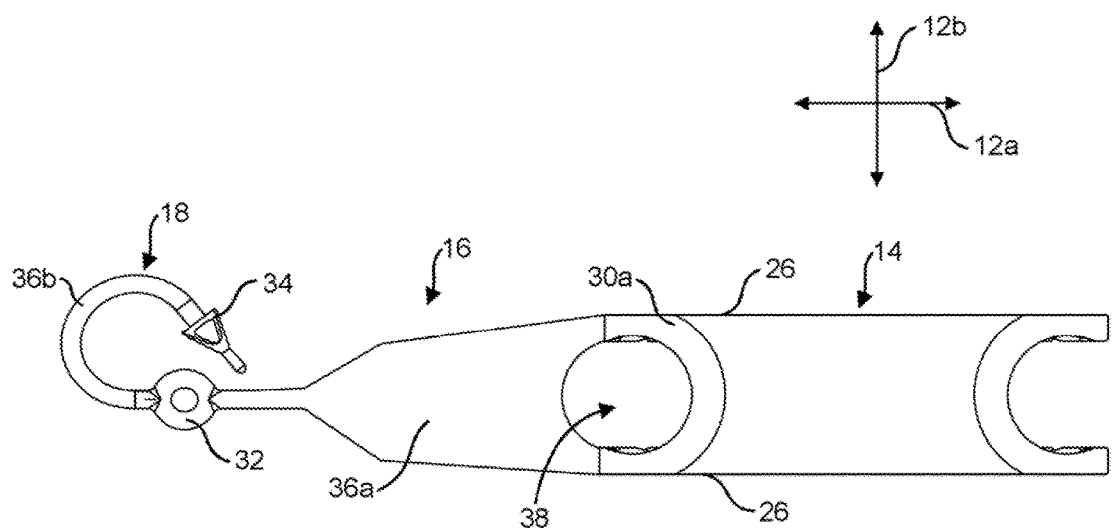
FIG. 2 is a top view of an alternative embodiment of a shackle guard with a tether in accordance with an embodiment of the present invention.
Figure 3:
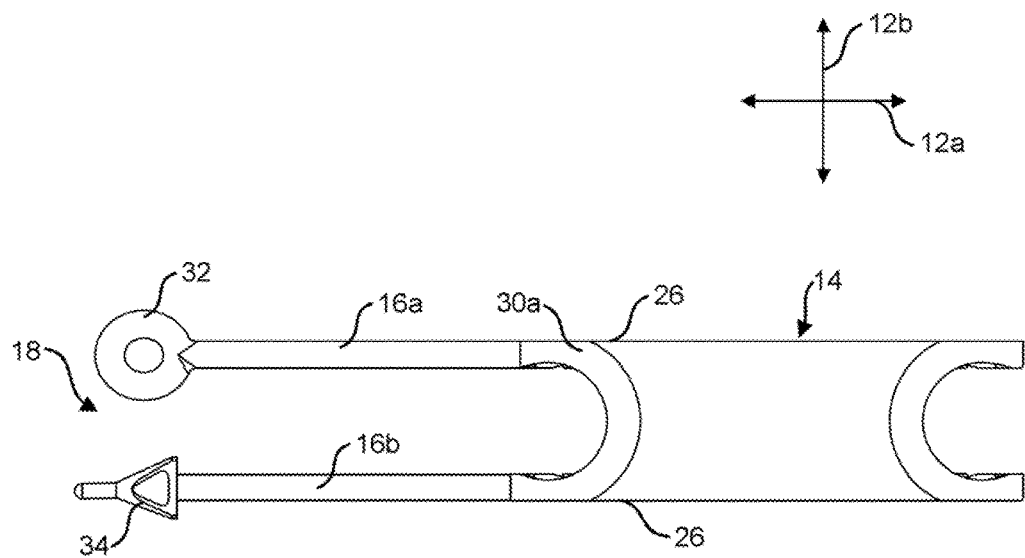
FIG. 3 is a top view of another alternative embodiment of a shackle guard with a tether in accordance with an embodiment of the present invention.

Referring to FIGS. 2 and 3, various other configurations of the tether 16 may be used for both utility and decorative function. In the embodiment of FIG. 2, the tether 16 secures to both walls 26 and defines an opening 38 with the end 30a in order to permit insertion of the shackle of a D-ring. The tether 16 of FIG. 2 may advantageously provide a larger surface for being logos or other decorative elements and also for resisting rotation of a pin of a D-ring. In the illustrated embodiment, some or all of the proximal portion 36a is flattened and some of the proximal portion 36a, such as a distal portion thereof, may be flattened or retain a round cross section. The distal portion 36b may be flattened or may retain a round cross section as for the embodiment of FIG. 1A.

In the embodiment of FIG. 3, the tether 16 includes two tethers 16a, 16b secured each secured to one of the walls 26, such as at the end 30a of the guard 14. The tethers 16a, 16b may be of equal or unequal length and may enhance the visual appeal of the apparatus 10 by being more symmetrical than the single tether embodiment. In the illustrated embodiment, the ring 32 secures to a distal end of one tether 16a and the barb 34 secures to the distal end of the other tether 16b.

Figure 4:
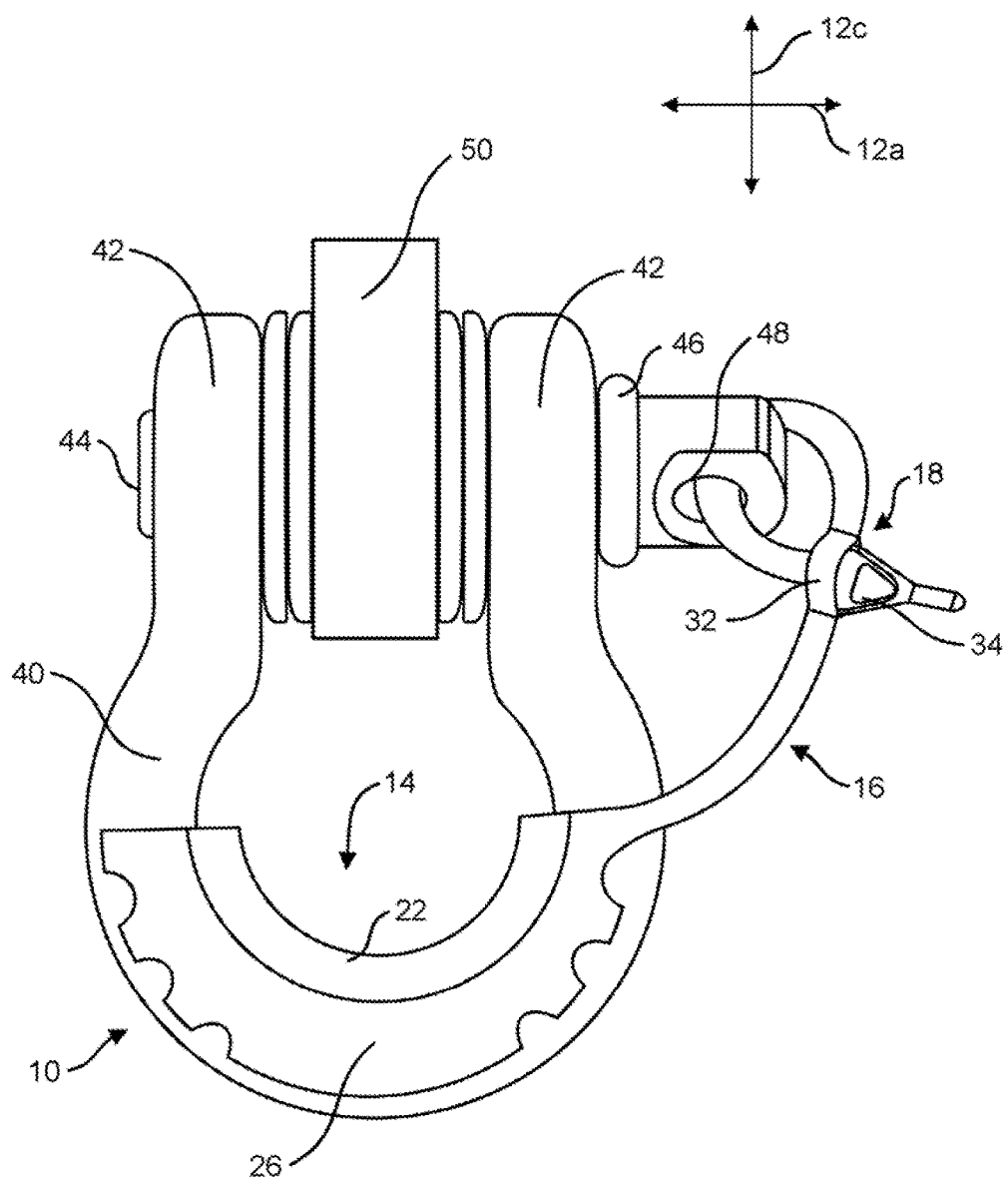
FIG. 4 illustrates a D-ring having the shackle guard and tether of FIG. 1 installed on the shackle and the tether engaging the pin in accordance with an embodiment of the present invention.

FIG. 4 illustrates an example use of the apparatus 10 on the shackle 40 of a D-ring. As shown the shackle includes a toroidal-shaped portion 40 that seats within the channel 20. The shackle 40 includes arms 42 including holes through which a pin 44 inserts. One of the holes is threaded (left side) such that the pin 44 may threadably secure therein. A head 46 of the pin 44 cooperates with the threaded engagement to prevent removal of the pin 44. The head 46 may have two or more flattened surface to facilitate tightening, such as a hexagonal shape.

The tether 16 extends outwardly from the shackle and is bent until it passes through a hole 48 in the head 46 of the pin 44. The barb 34 is then inserted through the ring 32 such that a loop of the tether 16 passes through the hole 48. In other embodiments, an end of the pin opposite the head 46 protrudes outwardly from the shackle and includes the hole 48 for receiving the tether 16. Where the embodiment of FIG. 3 is used, one tether 16a passes through the hole 48 and secures to the other tether 16b.

Securement of the tether 16 to the pin 44 reduces rotation of the pin 44 due to vibration and reduces the likelihood of accidental loosening of the pin 44. Accordingly, in addition to any decorative function of the tether 16 it may be sufficiently rigid to resist rotation.

In the configuration shown a strap may be passed over the outer seat 22 and walls 26 of the guard 14 and secured to a load. The pin 44 may pass through a connector 50 which is secured to lifting machinery. Vibration and twisting of the pin 44 that may unthread it during lifting is resisted by the tether. The guard 14 and tether 16 are typically formed of a colorful (bright, red, blue, yellow, etc.) material thereby enhancing the visual appeal of the apparatus in combination with a D-ring.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An apparatus comprising:
    a guard defining—
        an inner seat comprising an open channel shaped to receive a shackle and extend partially around the shackle; and
        an outer seat positioned opposite the open channel and shaped to support a strap passing through the shackle; and
    a tether fastened to the guard and defining a fastener for securing to a closure pin passing through the shackle;
    wherein the fastener comprises a hole formed in the tether and a barb formed on the tether offset from the hole.

2. The apparatus of claim 1, wherein the open channel has an arcuate axis.

3. The apparatus of claim 2, wherein, along the arcuate axis, a wall of the open channel is arcuate in a plane to which the arcuate axis is normal.

4. The apparatus of claim 3, wherein outer edges of the wall include one or more indentations.

5. The apparatus of claim 3, wherein the tether secures to an outer edge of the wall.

6. The apparatus of claim 3, wherein the tether is co-molded with the guard.

7. The apparatus of claim 3, wherein the outer seat has an arcuate shape that is concentric with the arcuate axis.

8. The apparatus of claim 1, further comprising:
the shackle seated within the open channel; and
the closure pin inserted through the shackle and having the fastener securing the tether to the closure pin.

9. An apparatus comprising:
a guard defining—
   an inner seat comprising an open channel shaped to receive a shackle and extend partially around the shackle; and
   an outer seat positioned opposite the open channel and shaped to support a strap passing through the shackle; and
a tether fastened to the guard and defining a fastener for securing to a closure pin passing through the shackle;
wherein the fastener comprises:
   a hole formed in the tether and offset from a distal end of the tether; and
   a barb at the distal end of the tether for insertion within the hole.

10. A method comprising:
providing a guard defining—
   an inner seat comprising an open channel shaped to receive a shackle and extend partially around the shackle;
   an outer seat positioned opposite the open channel and shaped to support a strap passing through the shackle;
providing a tether fastened to the guard and defining a fastener for securing to a closure pin passing through the shackle; and
seating the shackle in the open channel;
wherein the fastener comprises a hole formed in the tether and a barb formed on the tether offset from the hole, the method further comprising fastening the tether to itself using the fastener by inserting the barb into the hole.

11. The method of claim 10, further comprising:
passing the tether through a hole in the closure pin;
fastening the tether to itself using the fastener.

12. The method of claim 10, wherein:
the hole is formed in the tether and offset from a distal end of the tether; and
the barb is secured at the distal end of the tether for insertion within the hole.

13. The method of claim 10, wherein the open channel has an arcuate axis.

14. The method of claim 13, wherein, along the arcuate axis, a wall of the open channel is arcuate in a plane to which the arcuate axis is normal.

15. The method of claim 14, wherein outer edges of the wall include one or more indentations.

16. The method of claim 14, wherein the tether secures to an outer edge of the wall.

17. The method of claim 14, wherein the tether is co-molded with the guard.

18. The method of claim 14, wherein the outer seat has an arcuate shape that is concentric with the arcuate axis.

* * * * *